July 17, 1956 W. S. ELSY 2,754,864
DEEP HOLE SAW
Filed Oct. 27, 1952
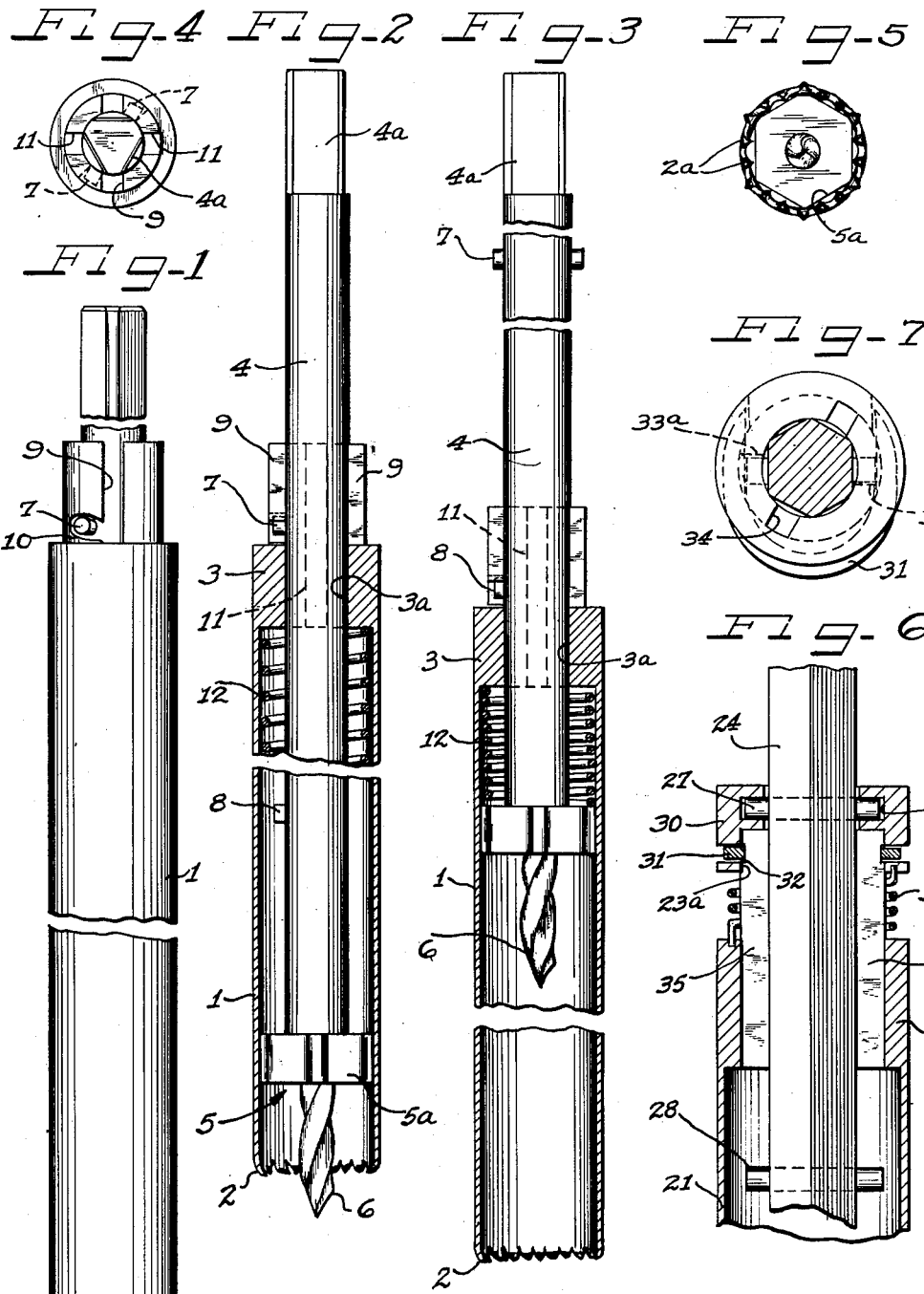
Inventor
Walter Stanley Elsy United States Patent Office 2,754,864
Patented July 17, 1956

2,754,864

DEEP HOLE SAW

Walter Stanley Elsy, Glen Ellyn, Ill.

Application October 27, 1952, Serial No. 317,123

3 Claims. (Cl. 145—120)

The present invention relates to mechanisms utilized in making circular apertures in solid materials. More particularly the invention relates to a mechanism for cutting holes of a rather large diameter in various materials and falls within the class of implement generally described as a hole saw.

Various methods of producing holes in solid objects have been utilized in the prior art. The most common method is that of drilling, in which a rotating drill member is utilized to remove a volume of material equal to the entire mass of material in the aperture. While drilling has been used for centuries in the cutting of holes in solid materials, several limitations of a serious nature appear in the use of this tool when holes of a large diameter are desired.

One such limitation is that drills are limited in outer diameter by the high torque requirements in the large sizes. This caused by the fact that the drill must actually cut away all of the material which is removed to make the hole. Since the high torque necessary for large size drills is not generally available in portable drilling equipment, this limitation has proven a serious one where large diameter holes must be made "in the field," away from heavy machinery.

A further limitation is the difficulty of cutting a fraction of a hole. By this is meant the cutting of an aperture near the edge of the article so that the hole breaks through at the edge. In such a situation the load on the drill is less at the edge of the material and the drill thus has a tendency to deflect toward the edge. If the drill is not prevented from following this tendency it will break away from the material altogether and will not drill completely through the material.

While these problems are important in the drilling of all types of materials, they are particularly important in the building trades. In cutting holes through walls, partitions and the like it is often found that the hole must pass through the edge of a joist, or other internal obstruction, as well as through nails or similar foreign matter. Large diameter drills of the conventional type have proven completely unsatisfactory for such work since they will not, as explained above, cut a true hole along the edges of joists found in walls and will not cut through nails encountered in the material.

In order to overcome these and other difficulties, the hole saw was developed. This construction comprised a saw blade similar to a hack-saw blade, but curved to form a circle. Rotation of the circular saw thus formed against the material would cause a circular portion substantially the size of the circle to be removed.

Since such a saw did not cut away much material and the loads were carried by the outer periphery only, it could cut large holes with relatively low torque requirements. The saw could also cut fractions of holes with no difficulty since there was little tendency for the circular saw to move transversely of its axis of rotation.

Hole saws of the prior art were unsatisfactory, however, in that they could not cut deep holes, no practical way of supporting a saw pilot being known. The pilot could not be eliminated, since a long, or deep, circular saw develops too much vibration to permit it to enter the material accurately without a pilot, even though the pilot is not necessary after the saw has a good start.

Still another difficulty encountered in the use of hole saws is the difficulty of ejecting the core of material removed by the saw in its operation. The core is just slightly smaller in diameter than the inner edges of the saw teeth, and while it could usually be shaken out of the saw, the presence of chips of material between the saw and the core would often prevent free movement thereof and consequently cause the core to be jammed inside of the saw blade. This caused difficulty since there was no convenient method of forcing the core outwardly. This problem was further aggravated where the saw was used to cut material which caused a great amount of heat. In such cases the core would become very hot, further complicating its removal.

It is therefore an important object of the present invention to eliminate all of the difficulties above enumerated which have heretofore been found in connection with hole saws.

A further object of the present invention is the provision of a hole saw having a short pilot which may be extended into engagement with the work to be sawed or may, instead, be moved relative to the saw blade to a position wherein it is out of contact with the work.

Another object of the present invention is the provision of a hole saw which may be utilized in accurately cutting holes of either a large depth or of only a shallow nature.

Another object of the present invention is the provision of a deep hole saw which is capable of great accuracy and which is relatively inflexible, even at the starting position.

Another object of the present invention is the provision of a deep hole saw which has a knock-out bar therein for easily effecting the removal of the core of material removed by the saw from the area within the circular saw blade.

A feature of the present invention is the provision of a hole saw which can be utilized as either a shallow or deep hole saw without the use of tools or other difficult means of adjustment.

Yet another object of the present invention is the provision of a deep hole saw having provision for a blade supporting member near the cutting edge of the saw during starting thereof and which may be moved away from the cutting edge after the saw has advanced to a point where such a support is no longer necessary.

Yet another feature of the present invention is the provision of a deep hole saw capable of rapid adjustment between a position in which the saw is capable of cutting a shallow hole and one in which it is capable of sawing a deep hole, and which is also easily disassembled without tools for changing saw blades or sharpening or replacing the pilot.

Still other and further objects will become apparent to those skilled in the art from a consideration of the attached sheet of drawings, in which I disclose two embodiments of my invention by way of illustration only.

On the drawings:

Figure 1 shows a deep hole saw constructed according to the present invention in position to cut a shallow hole or for initiating a deep hole.

Figure 2 discloses a hole saw in the position shown in Figure 1 and shows the parts in partial cross section.

Figure 3 shows the parts of the deep hole saw in position for finish drilling a deep hole, the parts being shown in partial cross section.

Figure 4 is an end view of the drill shown in Figure 1, looking at the drill from above.

Figure 5 is an end view of the drill shown in Figure 1, looking at it from below.

Figure 6 is a modification of the deep hole saw disclosed in Figure 1 and which is especially useful for heavy duty operations; and Figure 7 is an end view of the hole saw shown in Figure 6, taken from above.

As shown on the drawings:

As may clearly be seen from Figure 2, I provide a saw sleeve 1 having teeth 2 arranged to extend axially at the lower end thereof, and a hub 3 at the upper end thereof. The hub 3 may be integral with the sleeve 1, as shown, or may if desired be separate therefrom and fixedly secured thereto by any suitable fastening means.

A shaft or rod 4, which is circular in cross section, is slidably mounted within an aperture 3a in the hub 3. At the lower end of the rod 4 is positioned a guide member generally indicated at 5. This guide is preferably integral with the rod 4 but as in the case with the hub 3 may be made separate therefrom, if desired, for ease in manufacture.

As may clearly be seen from Figure 5, the guide 5 is provided with flat portions 5a. These portions are provided to clear the inwardly turned teeth 2a so that the guide and rod 4 may be assembled within the sleeve 1 from the lower, or toothed end.

Secured to the lower end of the shaft 4 is a pilot drill 6. This drill may be secured in the end of the shaft 4 by any conventional means, such as a set screw or drill chuck, and is intended to rotate with the shaft 4.

A pair of radially extending pins 7 and 8 are provided on the shaft 4 in axially spaced relation to one another. The hub 3 is axially slotted at 9 to allow the pins 7 and 8 to move downwardly into a laterally extending slot 10. After a pin, for example pin 7 as shown in Figure 1, has been moved downwardly into the slot 9 and then laterally into the slot 10, the saw sleeve 1 cannot move axially relative to the shaft 4 without first rotating the pin reversely out of the slot 10. Since the slot 10 extends from the slot 9 in the direction of rotation, torque applied to the shaft 4 tending to rotate it in the cutting direction will cause the pin 7 to remain in the slot 10 during the sawing operation.

As may be seen from Figure 4, shifting slots 11 are cut axially in the hub 3 at positions 90° removed from the slots 9. The slots 11 pass completely through the hub 3 and are of sufficient width and depth to permit the pins 7 and 8 to pass therethrough during shifting of the apparatus from a shallow to a deep hole cutting position, as will be explained later.

A spring 12 is positioned between the hub 3 and the guide 5 during assembly of the parts and is loose within the saw sleeve except when the parts are in the position shown in Figure 3. As may clearly be seen from that figure, in which the pin 8 is positioned in the lateral slot 10 and in which position the saw is in the deep hole cutting position, the spring 12 is compressed to a substantial degree. The compression of the spring 12 tends to maintain the parts in adjusted position, further minimizing the danger of the pin 8 becoming free of the slot 9, thereby allowing the parts to become disassembled during operation of the saw.

In operation, the saw is assembled as shown in Figs. 1 and 2, with the pin 7 located in the slot 10 after having been slid downwardly in the slot 9. In this position the pilot 6 extends beyond the cutting edge 2 and enters the material to be sawed prior to contact by the saw itself. The pilot permits the accurate centering of the saw, a feature which is particularly necessary when the saw is to be used with a portable power source.

After the saw has cut a small distance into the material it may be adjusted to continue to a greater depth, in the following manner: The rod 4 is rotated until the pin 8 is free of the slot 10 and is then reciprocated until the pin 7 is clear of the slot 9, at which point the shaft is rotated 90° so that the pin 7 is aligned with the slot 11. The shaft is then moved upwardly until the pin 8, which is exactly aligned with the pin 7, passes through the slot 11, compressing the spring 12. As soon as the pin 8 has cleared the slot 11 and is above the saw hub 3, the shaft is rotated until the pin 8 is aligned with the slot 9, at which point the shaft is released and allowed to move to the position shown in Figure 3, in which the spring 12 maintains the pin 8 in its lowermost position, as in the position shown in Figure 1. Rotation of the shaft 4 during the sawing operation will maintain the pin 8 in the slot 10, thereby preventing axial separation of the parts inadvertently during the sawing operation.

The easily adjusted hole saw disclosed above has not only provided a saw which is capable of handling a great diversification of work, but it has also provided a saw which will positively and easily remove from within the sleeve the slug of material sawed from the perforated object. All that is necessary to remove such a slug is to rotate the shaft 4 until the pins 7 or 8 are aligned with the slot 11 and thereafter reciprocate the shaft 4 until the slug is knocked out of the sleeve 1 by the pilot 6 and the guide 5. After the slug has been removed it is also a simple matter to completely disassemble the hole saw of the present invention for cleaning or sharpening purposes. The shaft 4 will completely pass downwardly through the saw sleeve 1, since the flat spots 5a on the guide 5 are cut as shown in Figure 5 to clear the inwardly deflected teeth 2a. After the guide 5 has passed the teeth 2 the entire shaft 4 may easily be completely withdrawn from the sleeve, leaving the spring 12 therein. The spring, having a high degree of flexibility, can easily be worked past the teeth 2a should it be necessary to remove it for cleaning or replacement purposes.

In Figures 6 and 7 I have shown a further embodiment which is basically similar to the construction shown in Figs. 1 through 5 but which has further features enabling it to handle heavier loads than the previously described apparatus.

In order to allow the use of the hole saws of the present invention in very hard materials, or likewise to allow the use of large diameter circle saws requiring high torque, it has been found desirable to utilize a stronger drive between the shaft 4 and the hub 3. As may be seen from Figures 6 and 7, the modified form provides a hexagonal shaft 24 which cooperates with a hexagonal aperture in the hub 23.

In view of this arrangement it is apparent that while the saw 21 may be reciprocated relative to the hexagonal shaft 24 it can in no circumstance be rotated relative thereto. In order to lock the pin 27 or 28 axially relative to the hub member 23 the collar 30 is provided. This collar is rotatable relative to the hub 23 on a circular portion 23a thereof but is maintained against reciprocation relative to the hub 23 by any conventional means such as, for example, a C-type clip retainer 31 which cooperates with the groove 32 in the hub 23. This type of retainer permits the relative movement between the member 30 and the hub 23 but prevents any movement between the two members in an axial direction.

The member 30 is provided with a groove 33 which cooperates selectively with the pin 27 or the pin 28, as may be seen from the dotted lines in Figure 7 at 33a. The groove 33 extends laterally from the slot 34 in the collar member 30. The slot 34 is of the same dimensions as the slot 35 in the hub 23 and when the collar 30 is rotated relative to the hub 23 until the slots 35 and 34 are in alignment, the pins 27 and/or 28 may be passed completely through both the hub 23 and the collar 30.

In adjusting the saw of the modification shown in Figures 6 and 7, the shaft 24 is reciprocated relative to the saw hub 23 with the slots 34 and 35 in alignment. When either the pin 27 or 28 is axially aligned with the groove 33 in the collar 30 the collar is then rotated relative to the hub 23 in a counterclockwise direction as viewed in Figure 7, thereby placing the pin in the groove or slot 33. In this position it is impossible to reciprocate the shaft 24 relative to the saw 21 and the saw may therefore be operated without danger of the elements becoming separated.

While it is contemplated that a snug frictional fit between the members 23a and 30, as well as between the spring C clip 31 and the groove 32, will maintain the collar 30 in its desired position, a torsional spring such as shown at 36 may be provided, if desired, between the hub 23 and the collar 30. This spring is pretensioned so as to place a torque on the collar 30, tending to rotate it counterclockwise as shown in Figure 7 to retain it in a position in which the pin 27 or 28 is within the groove 33.

From the above discussion it is readily apparent that the modification shown in Figures 6 and 7 is substantially the same as that shown in Figures 1 through 5 with the additional feature that the torque is transmitted from the shaft 24 to the hub 23 of the saw 21 in a direct manner, rather than through a pin. In the modification shown in Figures 6 and 7 the pin is utilized merely for purposes of controlling the relative axial position of the parts, rather than as a torque transmitting member. This is, of course, clearly an advantage in situations wherein the torque load to be transmitted is very high. However, the simplicity of the construction shown in Figures 1 through 5 is to be preferred in constructions in which very high torque is not necessary.

Either of the shafts 4 or 24 may be driven by means of conventional chucks or by means of special adaptors. As may be seen from Figures 2, 3 and 4, I have provided a triangular gripping portion 4a. This arrangement may of course be utilized with the shaft 24, but it is not intended that the hole saw of the present invention be limited to such a construction, since it is apparent that any number of variations may be utilized at this point to provide a connection to any conventional or special power source.

It will be understood that modifications and variations may be effected without departing from the scope of the novel concepts of the present invention.

I claim as my invention:

1. A deep hole saw comprising a long hollow cylindrical sleeve having saw teeth axially and radially extending from the periphery of one end thereof and a shaft carrying wall defining a bore at the other end thereof, a shaft slidably mounted in said bore and having a guide member secured at the end thereof within said sleeve, said guide member having portions thereon of a diameter substantially equivalent to the inside diameter of said sleeve whereby said sleeve is maintained in constant coaxial relation with said shaft, driving means at the other end of said shaft, means for preventing relative rotation between said sleeve and said shaft and means for permitting adjustment of the relative axial positions of said shaft and said sleeve, said last named means comprising pin means on said shaft, a longitudinal groove means in said bore defining wall permitting passage of said pin means through said bore, transversely extending groove means carried by said sleeve and means whereby one of said pin means may be selectively associated with said transverse groove means to limit the axial position of said shaft relative to said sleeve to a selected position, said transverse groove being independent of said longitudinal groove.

2. A deep hole saw comprising a long hollow cylindrical sleeve having axially and radially projecting saw teeth at one end thereof, shaft guiding means at the other end thereof, said shaft guiding means constituting a polygonal aperture, a correspondingly polygonal shaft guided in said aperture and having means at one end thereof for cooperation with a power source and guide means on the outer end thereof within said sleeve, said guide member having portions thereon of a diameter substantially equivalent to the inside diameter of said sleeve for cooperation with the inside surface of said sleeve to maintain the sleeve in coaxial alignment with said shaft, lock means rotatable on said sleeve, a plurality of cooperating pin means on said shaft for cooperation with said rotatable lock means and spring biasing means associated with said rotatable lock means for urging and maintaining said rotatable lock means in a position preventing axial movement of said shaft relative to said sleeve in a selected position, said lock means having a transverse slot for cooperation with one of said pins upon rotation of said lock means by said spring.

3. A deep hole saw comprising a long hollow cylindrical sleeve having saw teeth axially extending from the periphery of one end thereof, and a wall surface defining a guide bore at the other end thereof, a shaft slidably mounted in said bore and having a guide member secured to the end thereof within said sleeve, said guide member having a diameter substantially equivalent to the inside diameter of said sleeve whereby said sleeve is maintained in coaxial relation with said shaft, driving means at the other end of said shaft, means for preventing relative rotation between said sleeve and said shaft, and means for permitting adjustment of the relative axial positions of said shaft and said sleeve, said last named two means comprising pin means on said shaft, a first longitudinal slot in said bore-defining wall surface to permit passage of said pin means therethrough, a second longitudinal slot extending only partially through said bore-defining wall surface, and a transverse slot associated with the blind end of said second slot and extending in the direction of rotation of said shaft, whereby one of said pin means may be selectively associated with said transverse slot means to limit the axial position of said shaft relative to said sleeve to a selected position and may be dissociated therefrom and passed through said first slot for a change in axial position.

References Cited in the file of this patent
UNITED STATES PATENTS

| Number | Name | Date |
|---|---|---|
| 25,289 | Taylor et al. | Aug. 30, 1859 |
| 348,815 | Bailey | Sept. 7, 1886 |
| 468,595 | Bunch | Feb. 9, 1892 |
| 662,748 | Wood | Nov. 27, 1900 |
| 746,167 | Romans et al. | Dec. 8, 1903 |
| 814,020 | Clifford | Mar. 6, 1906 |
| 916,536 | Davis | Mar. 30, 1909 |
| 958,112 | Halliwell et al. | May 17, 1910 |
| 1,028,126 | Meredith | June 4, 1912 |
| 2,592,978 | Trimboli | Apr. 15, 1952 |

FOREIGN PATENTS

| Number | Country | Date |
|---|---|---|
| 81,021 | Sweden | July 24, 1934 |